United States Patent [19]
Pfefferle

[11] 3,914,090

[45] Oct. 21, 1975

[54] METHOD AND FURNACE APPARATUS

[75] Inventor: William C. Pfefferle, Middletown, N.J.

[73] Assignee: Engelhard Minerals & Chemicals Corporation, Murray Hill, N.J.

[22] Filed: Oct. 8, 1974

[21] Appl. No.: 513,139

Related U.S. Application Data

[63] Continuation-in-part of Ser. No. 142,939, May 13, 1971, abandoned, Continuation-in-part of Ser. No. 164,718, July 21, 1971, abandoned, Continuation-in-part of Ser. No. 252,916, May 12, 1972, abandoned, Continuation-in-part of Ser. No. 358,411, May 8, 1973, abandoned.

[52] U.S. Cl..................................... 431/9; 431/115
[51] Int. Cl.² ............................................ F23M 3/00
[58] Field of Search.......... 431/2, 8, 9, 10, 115, 116

[56] References Cited
UNITED STATES PATENTS

| | | |
|---|---|---|
| 3,729,285 | 4/1973 | Schwedersky .......................... 431/8 |
| 3,868,211 | 2/1975 | LaHaye ................................. 431/10 |

*Primary Examiner*—Edward G. Favors

[57] ABSTRACT

Carbonaceous fuel is thermally combusted with an amount of air substantially less than that needed for complete combustion to carbon dioxide and water of all the combustible components in the fuel to produce a gaseous effluent containing a substantial proportion of carbon monoxide but little or no nitrogen oxides. Additional carbonaceous fuel is mixed with air, and at least a portion of this mixture is passed into the presence of a solid oxidation catalyst for adiabatic combustion at a temperature above the instantaneous auto-ignition temperature of the mixture but below nitrogen-oxide-forming temperatures. The first gaseous effluent and the gases exiting from the catalyst are mixed and thermal combustion takes place in this mixture to produce a completely combusted final combustion effluent which is low in atmospheric pollutants, particularly nitrogen oxides.

46 Claims, 5 Drawing Figures

METHOD AND FURNACE APPARATUS

This application is a continuation-in-part of prior abandoned applications, Ser. No. 142,939, filed May 13, 1971, Ser. No. 164,718, filed July 21, 1971, and Ser. No. 252,916, filed May 12, 1972, and copending application Ser. No. 358,411, filed May 8, 1973.

BACKGROUND OF THE INVENTION

This invention relates to a furnace method and apparatus for burning carbonaceous fuel to produce energy in the form of heat.

One of the most important problems encountered in designing and operating furnaces is to control the amounts of nitrogen oxides in the furnace exhaust gases, since nitrogen oxides are an extremely serious air pollution problem. Substantial amounts of nitrogen oxides inevitably form when fuel and at least a stoichiometric amount of air are combusted at temperatures in excess of about 3300°F. As used herein and in the appended claims, the term air means any gas or combination of gases including oxygen available for combustion reactions, and the term stoichiometric amount of air means an amount of air which is theoretically sufficient for complete oxidation of all the combustible components in a given amount of fuel (e.g., to carbon dioxide and water). The term carbonaceous fuel means any fuel in which a substantial proportion of the fuel value is elemental carbon or carbon compounds containing carbon in combustible combination with other elements such as hydrogen.

One way of reducing the amounts of nitrogen oxides formed in a furnace is to lower the temperature in the furnace by mixing the fuel with an increased volume of effectively inert gas to produce a diluted fuel-air mixture. For reasons of thermal efficiency, it is almost always preferable to use no more air in the furnace than is required for complete combustion of the fuel (i.e., as close to the stoichiometric amount of air as possible). Any air in excess of the stoichiometric amount must be heated, generally from ambient temperature, to the temperature in the furnace and then exhausted into the atmosphere again, carrying with it whatever heat cannot be recovered for a useful purpose. The preferred source of inert gases for mixing with the fuel and air to lower combustion temperature are the final combustion effluent or stack gases of the furnace. These gases are warmer than ambient air, but substantially cooler than the gases leaving the combustion zone. Accordingly, a portion of the final combustion effluent gases of the furnace may be recycled to dilute the fuel and air supplied to the furnace to lower combustion temperatures in the furnace and help control the formation of nitrogen oxides.

Another way in which the formation of nitrogen oxides can be controlled is by conducting the combustion of the fuel in two or more successive stages. In the first stage, a mixture of fuel and an amount of air substantially less than the amount needed for complete combustion of the fuel (i.e., a non-stoichiometric mixture on the fuel-rich side) is thermally combusted to produce a gaseous effluent containing a substantial proportion of carbon monoxide. This effluent may also contain some uncombusted or partially combusted fuel. The temperature of this combustion (which is low relative to the stoichiometric combustion temperature) and particularly the insufficiency of air in this first thermal combustion stage substantially limit the formation of nitrogen oxides. Heat is withdrawn from the first stage effluent and that effluent is then mixed with additional air and thermally combusted in a subsequent thermal combustion stage or stages. The additional air is sufficient to make up the deficiency of air supplied to the first thermal combustion stage so that in the subsequent stage or stages all of the carbon monoxide in the first stage effluent is completely oxidized to carbon dioxide and any unburned or partially burned fuel in that effluent is completely oxidized to carbon dioxide and water. Although conditions in at least the last of the combustion stages must be sufficiently oxidizing to insure complete combustion of the fuel, less nitrogen oxides are produced than would be produced in a single-stage combustion system.

Although the foregoing systems decrease the formation of nitrogen oxides, these systems do not eliminate formation of nitrogen oxides and are, in addition, typically more difficult to operate and control. For example, in these systems it is frequently more difficult to achieve efficient thermal combustion reactions and avoid formation of substantial amounts of incomplete combustion products such as carbon monoxide and uncombusted hydrocarbons without the production of high concentrations of nitrogen oxides. Although only an insignificant amount of fuel value may be lost as a result of this incomplete combustion, the incomplete combustion products are another serious air pollution problem. To insure complete combustion of the fuel and for general ease of operation, furnaces are therefore frequently operated with substantially more air than is theoretically sufficient for complete combustion of the fuel supplied to the furnace. As mentioned above, however, excess air decreases thermal efficiency. In addition, there are practical limits on how far temperatures can be lowered in a conventional two-stage combustion furnace and still maintain stable combustion. This in turn limits the achievable reduction in nitrogen oxide formation.

In view of the foregoing, it is an object of this invention to reduce the amount of atmospheric pollutants produced by furnaces burning carbonaceous fuels to produce thermal energy.

It is another object of this invention to increase the thermal efficiency of furnaces burning carbonaceous fuel to produce thermal energy.

It is yet another object of this invention to increase the efficiency of combustion in furnaces burning carbonaceous fuel to produce thermal energy, particularly in combination with low production of nitrogen oxides.

In copending application Ser. No. 358,411, filed May 8, 1973, and incorporated herein by reference, there is disclosed the discovery of catalytically-supported, thermal combustion. According to this method, carbonaceous fuels can be combusted very efficiently at temperatures between about 1700° and 3200°F, for example, without the formation of substantial amounts of carbon monoxide or nitrogen oxides by a process designated catalytically-supported, thermal combustion. To summarize briefly what is discussed in greater detail in application Ser. No. 358,411, in conventional thermal combustion of carbonaceous fuels, a flammable mixture of fuel and air or fuel, air, and inert gases is contacted with an ignition source (e.g., a spark) to ignite the mixture. Once ignited, the mixture continues to burn without further support from the ignition source.

Flammable mixtures of carbonaceous fuels normally burn at relatively high temperatures (i.e., normally well above 3300°F). At these temperatures substantial amounts of nitrogen oxides inevitably form if nitrogen is present, as is always the case when air is the source of oxygen for the combustion reaction. Mixtures of fuel and air or fuel, air, and inert gases which would theoretically burn at temperatures below about 3300°F are too fuel-lean to support a stable flame and therefore cannot be satisfactorily burned in a conventional thermal combustion system.

In conventional catalytic combustion, on the other hand, the fuel is burned at relatively low temperatures (typically in the range of from a few hundred degrees Fahrenheit to approximately 1400°F) and little or no nitrogen oxides are formed. Prior to the invention described in application Ser. No. 358,411, however, catalytic combustion was regarded as having limited value as a source of thermal energy. In the first place, conventional catalytic combustion proceeds relatively slowly so that impractically large amounts of catalyst would be required to produce enough oxidation gases to drive a turbine or to consume the large amounts of fuel required in most large furnace applications. In the second place, the reaction temperatures normally associated with conventional catalytic combustion are too low for efficient transfer of heat for many purposes, for example, transfer of heat to water in a steam boiler. Typically, catalytic combustion is also relatively inefficient, so that large amounts of carbon monoxide are produced or left uncombusted unless low space velocities in the catalyst are employed.

Catalytic combustion reactions follow the course of the graph shown in FIG. 1 of the accompanying drawing, to the extent of regions A through C in that Figure. This graph is a plot of reaction rate as a function of temperature for a given catalyst and set of reaction conditions. At relatively low temperatures (i.e., in region A of FIG. 1) the catalytic reaction rate increases exponentially with temperature. As the temperature is raised further, the reaction rate enters a transition zone (region B in the graph of FIG. 1) in which the rate at which the fuel and oxygen are being transferred to the catalytic surface begins to limit further increases in the reaction rate. As the temperature is raised still further, the reaction rate enters a so-called mass transfer limited zone (region C in the graph of FIG. 1) in which the reactants cannot be transferred to the catalytic surface fast enough to keep up with the catalytic surface reaction and the reaction rate levels off regardless of further temperature increases. In the mass transfer limited zone, the reaction rate cannot be increased by increasing the activity of the catalyst because catalytic activity is not determinative of the reaction rate. Prior to the invention described in application Ser. No. 358,411, the only apparent way to increase the reaction rate in the mass transfer limited zone was to increase the mass transfer rate. However, this requires an increase in the pressure drop across the catalyst and consequently a substantial loss of energy. Sufficient pressure drop may not even be available to provide the desired reaction rate. Of course, more mass transfer can be effected, and hence more energy can always be produced, by increasing the amount of catalyst surface. In many applications, however, this results in catalyst configurations of such size and complexity that the cost is prohibitive and the body of the catalyst is unwieldy. For example, in the case of gas turbine engines, the catalytic reactor might very well be larger than the engine itself.

As described in application Ser. No. 358,411, it has been discovered that it is possible to achieve essentially adiabatic combustion in the presence of a catalyst at a reaction rate many times greater than the mass transfer limited rate. In particular, it has been found that if the operating temperature of the catalyst is increased substantially into the mass transfer limited zone, the reaction rate again begins to increase rapidly with temperature (region D in the graph of FIG. 1). This is in apparent contradiction of the laws of mass transfer kinetics in catalytic reactions. The phenomenon may be explained by the fact that the temperature of the catalyst surface and the gas layer near the catalyst surface are above the instantaneous auto-ignition temperature of the mixture of fuel, air, and any inert gases (defined herein and in application Ser. No. 358,411 to mean the temperature at which the ignition lag of the mixture entering the catalyst is small compared to the residence time of the mixture in the combustion zone) and at a temperature at which thermal combustion occurs at a rate higher than the catalytic combustion rate. The fuel molecules entering this layer burn spontaneously without transport to the catalyst surface. As combustion progresses and the temperature increases, it is believed that the layer in which thermal combustion occurs becomes deeper. Ultimately, substantially all of the gas in the catalytic region is raised to a temperature at which thermal combustion occurs in virtually the entire gas stream rather than just near the surface of the catalyst. Once this stage is reached within the catalyst, the thermal reaction appears to continue even without further contact of the gas with the catalyst.

The foregoing is offered as a possible explanation only and is not to be construed as in any way limiting the present invention.

Among the unique advantages of the above-described combustion in the presence of a catalyst is the fact that mixtures of fuel and air which are too fuel-lean for ordinary thermal combustion can be burned efficiently. Since the temperature of combustion for a given fuel at any set of conditions (e.g., initial temperature and, to a lesser extent, pressure) is dependent largely on the proportions of fuel, of oxygen available for combustion, and of inert gases in the mixture to be burned, it becomes practical to burn mixtures which are characterized by much lower flame temperatures than those of the customary combustible mixtures. In particular, carbonaceous fuels can be burned very efficiently and at thermal reaction rates at temperatures in the range from about 1700° to about 3200°F. At these temperatures very little nitrogen oxides are formed, if any, and indeed the reaction may be such as actually to decrease the amounts of nitrogen oxides present in the gases supplied to the reaction. In addition, because the combustion as above described is stable over a wide range of mixtures, it is possible to select or control reaction temperature over a correspondingly wide range by selecting or controlling the realtive proportions of the gases in the mixture.

The combustion method, as described in the copending application Ser. No. 358,411, involves essentially adiabatic combustion of a mixture of fuel and air or fuel, air, and inert gases in the presence of a solid oxidation catalyst operating at a temperature substantially above the instantaneous auto-ignition temperature of the mixture, but below a temperature which would result in any substantial formation of oxides of nitrogen under the conditions existing in the catalyst. The instantaneous auto-ignition temperature of the mixture is defined above. Essentially adiabatic combustion means in this case that the operating temperature of the catalyst does not differ by more than about 300°F, more typically no more than about 150°F, from the adiabatic flame temperature of the mixture due to heat losses from the catalyst.

SUMMARY OF THE INVENTION

In accordance with the principles of this invention, carbonaceous fuel in any form is thermally combusted in the first thermal combustion zone or stage of a furnace, utilizing a first mixture formed of the fuel and an amount of air substantially less than the amount needed for complete combustion to carbon dioxide and water of all the combustible components in the fuel, to produce a gaseous first effluent containing a substantial proportion of carbon monoxide. This effluent may also contain some uncombusted or partially combusted fuel (e.g., some unburned or partially burned hydrocarbons). Heat ordinarily is withdrawn from the first thermal combustion zone for whatever purpose the furnace is being operated (e.g., to generate steam in boiler tubes in the furnace), thereby cooling the first effluent. If it is desired to retain the heat of this first stage combustion in the effluent, it is possible to carry out this combustion adiabatically while adding inert quench gas to limit the temperature rise at this stage.

A second mixture is also formed of additional carbonaceous fuel and air such that this second mixture can be conducted through or past a catalyst and at least partially combusted in the presence thereof. The amount of air mixed with the additional fuel is preferably just sufficient to oxidize to carbon dioxide and water all the additional fuel and all combustible components remaining in the gaseous first effluent; although less than this amount of air may be mixed with the additional fuel at this point and the remainder then supplied directly to the second thermal combustion state described below. The additional fuel may be the same as that supplied to the furnace for thermal combustion in the first combustion zone, or it may be a completely different carbonaceous fuel. At least a portion of this second mixture is fed to a solid oxidation catalyst where it is subjected to essentially adiabatic combustion in the presence of the catalyst operating at a temperature substantially above the instantaneous auto-ignition temperature of the mixture but below a temperature that would result in any substantial formation of oxides of nitrogen, producing a second effluent. Typically, the operating temperature of the catalyst is in the range from about 1700° to about 3200°F, preferably from about 2000° to about 3000°F. Although there may be a small amount of radiant or conductive heat transfer away from the catalyst, the combustion taking place in the presence of the catalyst remains essentially adiabatic, as stated above.

The first effluent and the second effluent, produced as just described, are mixed and thermally combusted in a second thermal combustion stage or zone downstream of the catalyst to produce a final combustion effluent. Combustion in this second thermal combustion zone is induced and maintained by the temperature levels resulting from the combination of the first and second effluent gases. A portion of the second fuel-air mixture may be allowed to by-pass the catalyst and enter the second thermal combustion zone directly for thermal combustion with the other gases downstream of the catalyst. Additional heat is withdrawn from this second thermal combustion zone for the purpose for which the furnace is being operated (e.g., to generate steam). When the final combustion effluent gases are too cool for further efficient transfer of heat for the principal purpose of furnace operation, additional heat may be recovered from these gases by conducting them to one or more heat exchanges, for example, for preheating water returning to the furnace for conversion to steam and for preheating the air mixed with the fuel prior to combustion. Some of these final combustion effluent gases may be recycled in the furnace by mixing them with the first fuel and air mixture, supplied to the first thermal combustion stage, or with the second mixture passed in the presence of the catalyst, or with both mixtures. The remaining final combustion effluent gases may be exhausted into the atmosphere.

Advantageously, as much as possible of the total amount of fuel supplied to the furnace is fed to the furnace by way of the second mixture for combustion in the presence of the catalyst. This combustion and the thermal combustion of the first and second effluents downstream of the catalyst are both very stable and efficient, even at the low temperatures which substantially prevent the formation of nitrogen oxides. Substantially complete combustion of all the fuel supplied to the furnace can therefore be achieved with only slightly more air than is theoretically sufficient for such complete combustion, even while the formation of nitrogen oxides is substantially prevented. The thermal efficiency of furnaces constructed in accordance with the principles of this invention is therefore high, while at the same time emissions of air pollutants (particularly carbon monoxide and nitrogen oxides) are low.

Further features of the invention, its nature and various advantages, will be more apparent from the accompanying drawing and the following detailed description of the invention.

DETAILED DESCRIPTION OF THE INVENTION

Figure 1:
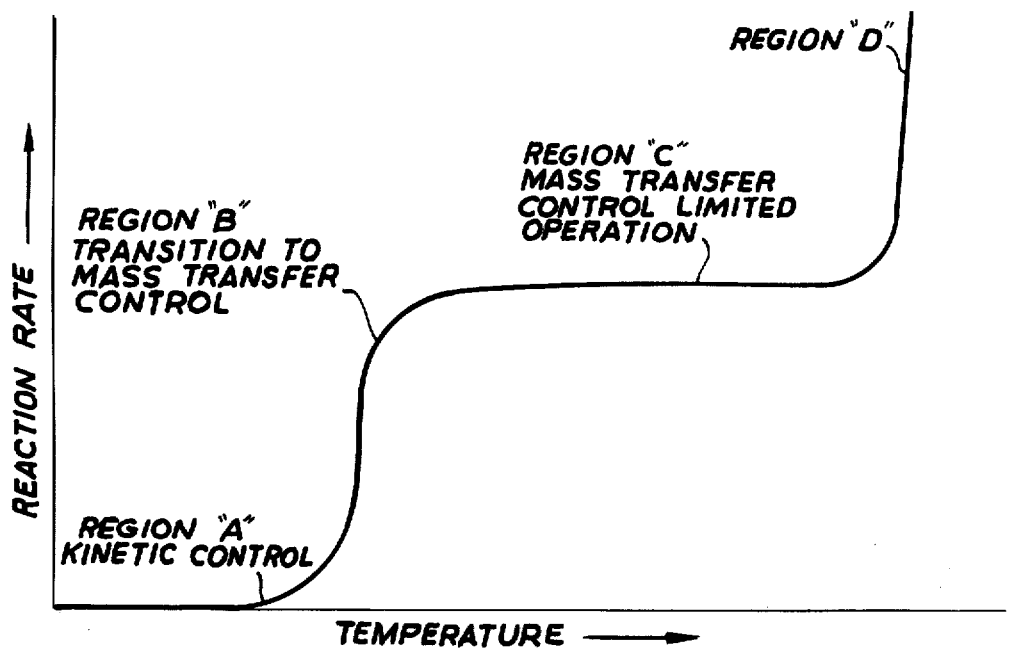
FIG. 1 is, as described above, a graph of combustion reaction rate as a function of temperature for combustion in the presence of a solid oxidation catalyst.
Figures 2, 3:
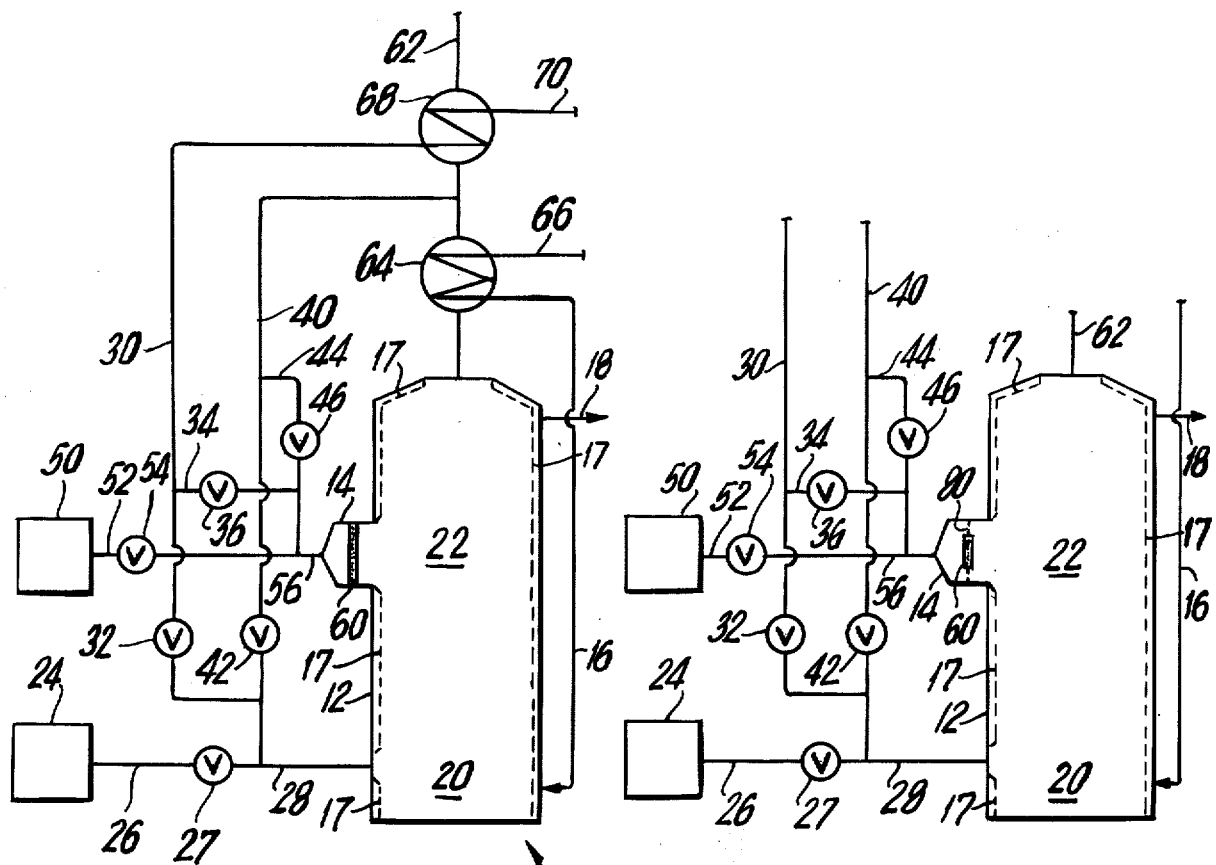
FIG. 2 is a simplified schematic drawing of a furnace constructed in accordance with the principles of this invention for burning atomized, vaporized, gaseous, or gasified carbonaceous fuels.
FIG. 3 is a simplified schematic drawing showing a modification of the furnace of FIG. 2 in accordance with the principles of this invention.

As shown in FIG. 2, a furnace 10 for burning atomized, vaporized, gaseous, or gasified carbonaceous fuel includes a vertically disposed combustion housing 12, and a catalyst-containing combustion housing 14 communicating with an intermediate portion of combustion housing 12. Although furnaces constructed in accordance with the principles of this invention may be operated to produce heat for practically any purpose, it will be assumed that the furnaces described herein are being operated to produce heat for the generation of steam. Accordingly, water (which may be preheated as described below) is supplied to a system of boiler tubes represented schematically by broken lines 17 in thermal combustion housing 12 by way of line 16 and, after conversion to steam, exits from that boiler tube system by way of line 18. Of course, all the various parts of boiler tube system 17 are interconnected.

Combustion housing 12 includes a first thermal combustion zone 20 near the bottom of housing 12, this portion of housing 12 serving as means for thermally combusting a first mixture of fuel and air, and a second thermal combustion zone 22 above zone 20 and adjacent catalyst-containing combustion housing 14. Carbonaceous fuel from fuel supply 24 is supplied to the first thermal combustion zone by way of line 26 having valve 27 and line 28. In line 28, the fuel is mixed with preheated air supplied by way of air supply line 30 having valve 32 and, if desired, with inert gases (i.e., a recycled portion of the final combustion effluent of the furnace) supplied by way of recycle gas supply line 40 having valve 42, forming the aforesaid first mixture. If the carbonaceous fuel is initially solid, fuel supply 24 must include apparatus for gasifying the fuel for passage to the furnace via line 26. If the fuel is initially liquid, line 28, or line 40 if desired, may include apparatus for spraying the fuel into the preheated air and/or hot recycle gases to atomize or vaporize the fuel. Examples of carbonaceous fuels which can be burned in the furnaces of this invention are any solid carbonaceous fuel (e.g., coal, coke, charcoal, etc.) which can be gasified; any normally liquid hydrocarbon (e.g., naphtha, kerosene, diesel oil, fuel and heating oils, certain residual and non-distilled mineral oils, etc.) which can be at least partially vaporized; alkanols such as methanol, ethanol, and other fuels containing combined oxygen such as carbon monoxide; and practically any normally gaseous hydrocarbon such as methane, ethane, propane, and other low molecular weight hydrocarbons.

The amount of air mixed with the fuel supplied to thermal combustion zone 20 is substantially less than the amount needed for complete combustion of all the combustible components in the fuel to carbon dioxide and water. Thermal combustion in zone 20 therefore takes place under relatively reducing conditions, as is desirable to prevent the formation of excessive amounts of nitrogen oxides, and the gaseous effluent of the thermal combustion contains a substantial proportion of carbon monoxide. The gaseous thermal combustion effluent may also contain some uncombusted or partially combusted fuel (e.g., some unburned or partially burned hydrocarbons). On the other hand, the amount of air supplied to thermal combustion zone 20 must be at least sufficient to provide a flammable mixture in zone 20 and is also preferably sufficient to prevent any substantial formation of soot. Depending on the kind and quantity of fuel supplied to thermal combustion zone 20, the amount of air supplied to zone 20 may vary from about 50 to 90% of the stoichiometric amount for that fuel. Lower percentages in this range may be possible when the fuel supplied to zone 20 is carbon monoxide, methanol, and the like. In the case of fuels (e.g., vaporized or gaseous hydrocarbons) for which soot formation is a more serious problem, the amount of air supplied to zone 20 is preferably from about 80 to 90% of the stoichiometric amount. The gaseous thermal combustion effluent typically contains from about 5 to 30, preferably at least about 10, volume percent carbon monoxide.

The amount of recycle gases supplied to thermal combustion zone 20 may be governed by a number of considerations. For example, it may be desirable to supply these gases to achieve a predetermined combustion temperature in thermal combustion zone 20 or to increase the volume of gases flowing through the furnace to improve heat transfer from the thermal combustion zones of the furnace. In any event, the relative proportions of fuel, air, and recycle gases supplied to thermal combustion zone 20 must always be such as to provide a flammable mixture for thermal combustion in zone 20.

Although in the particular embodiment shown in FIG. 2, air from air supply line 30 and recycle gases from recycle gas supply line 40 are mixed together prior to mixing with fuel in line 28, it will be understood that these three components can be mixed together in any order or simultaneously as desired. Similarly, although all three of these components are shown as mixed together prior to being fed to furnace 10, it will be understood that any one or all three components can be fed to furnace 10 separately and mixed with the other components in thermal combustion zone 20. For example, if the fuel from fuel supply 24 is a liquid fuel, it may be desirable to vaporize it in thermal combustion zone 20 by spraying it directly into housing 12. Air and recycle gases can then be supplied to thermal combustion zone 20 by separate gas distribution means. If fuel is mixed with air prior to being fed to furnace 10, conditions in the mixture are preferably such that little or no thermal combustion takes place before the mixture enters housing 12.

Returning to the embodiment shown specifically in FIG. 2, in first thermal combustion zone 20, the mixture of fuel, air, and recycle gases supplied to the furnace by way of line 28 is thermally combusted. Conventional apparatus (not shown) is provided for igniting the mixture in housing 12 and for insuring that flame is continuous once it has been established. Heat is withdrawn from thermal combustion zone 20 to generate steam in boiler tubes 17, thereby cooling the effluent gases as they rise in housing 12 toward second thermal combustion zone 22.

Although only one inlet for the mixture of fuel, air, and recycle gases supplied to thermal combustion zone 20 is shown in FIG. 2, it will be understood that any number and arrangement of inlets can be used to adequately distribute the mixture in the furnace. For example, the furnace may be a tangentially or corner fired furnace in which the mixture is fed to the furnace at several points around the periphery of housing 12 with a tangential component of velocity to produce a swirling fireball in the furnace.

In addition to the fuel from fuel supply 24 being thermally combusted in first thermal combustion zone 20 as described above, additional carbonaceous fuel supplied from fuel supply 50 by way of line 52 having valve 54 is mixed with air supplied from line 30 by way of line 34 having valve 36 and, if desired, with recycle gases supplied from line 40 by way of line 44 having valve 46 to produce a catalytically combustible second mixture containing fuel and air in line 56. The aforesaid fuel supply, lines, and valves thus constitute convenient means for forming the second mixture. The recycle gases are substantially inert, but may have a small component of unconsumed combustion oxygen. This mixture is fed to the combustion housing 14 wherein at least a portion of the second mixture is combusted in the presence of solid oxidation catalyst 60 disposed across a portion of housing 14 to produce a second effluent.

Any of the fuels mentioned above as suitable for combustion in thermal combustion zone 20 are also suitable for combustion in the catalyst-containing combustion housing 14. Since at least a portion of the fuel in the second mixture from fuel supply 50 is to be combusted in the presence of catalyst 60, at least a portion of the fuel must be in catalytically combustible form (such as atomized, vaporized, gaseous, or gasified) by the time it reaches the catalyst. Accordingly, if the fuel supplied by fuel supply 50 is initially solid, fuel supply 50 must include apparatus for gasifying the fuel for passage to the combustion housing 14 via line 52. If the fuel supplied by fuel supply 50 is initially liquid, line 56 may include apparatus for spraying the fuel into the preheated air and/or hot recycle gases respectively supplied by way of lines 34 and 44 to atomize and/or at least partially vaporize the fuel. Even if some of the liquid fuel reaches catalyst 60 in liquid form, however, additional vaporization occurs when the fuel contacts the hot catalyst. Although separate fuel supplies 24 and 50 are shown in FIG. 2, it will be understood that the fuel fed to the first thermal combustion zone 20 and to the combustion housing 14 may be the same or different fuel as desired, and if the fuel is the same, it may be ultimately derived from one source. For example, the fuel supplied by fuel supply 24 may be fuel oil and the fuel supplied by fuel supply 50 may be natural gas, or the fuel supplied by both fuel supplies may be natural gas. The fuel supplied by either or both fuel supplies may fluctuate seasonally, depending on the availability of certain fuels.

The amount of air supplied by way of line 34 for mixing with the fuel from fuel supply 50 is preferably just sufficient for complete combustion to carbon dioxide and water of all the fuel from fuel supply 50 and of all the uncombusted and incompletely combusted values remaining in the first effluent, leaving combustion zone 20. Thus, the total amount of air supplied to the furnace (i.e., to both the first thermal combustion stage in zone 20 and the catalyst-containing combustion stage in housing 14) is at least the stoichiometric amount for the total amount of fuel supplied to the furnace. Moreover, in the interest of thermal efficiency, the total amount of air supplied to the furnace is preferably no more in excess of the stoichiometric amount than is actually necessary for substantially complete combustion of all the fuel supplied to the furnace. Recycle gases are supplied by way of line 44 in the amount needed to produce a final mixture in line 56 having a desired adiabatic flame temperature.

Although in the particular embodiment shown in FIG. 2, air supplied by way of line 34 and recycle gases supplied by way of line 44 are mixed together prior to mixing with fuel in line 56, it will be understood that these components of the second mixture may be mixed together in any order or simultaneously as desired. Furthermore, although all three of these components are shown being mixed together prior to being fed to housing 14, it will be understood that any one or all three of these components can be fed to housing 14 separately and mixed with the others in housing 14 prior to passage through or in the presence of catalyst 60. The second mixture including fuel and air passing to catalyst 60 is such that little or no combustion occurs in housing 14 at temperatures which would result in any substantial formation of nitrogen oxides.

As mentioned above, in the combustion in the presence of a catalyst taking place in housing 14, at least a portion of the second mixture supplied by way of line 56 is combusted under essentially adiabatic conditions in the presence of solid oxidation catalyst 60 operating at a temperature substantially above the instantaneous auto-ignition temperature of the mixture but below a temperature at which polluting amounts of nitrogen oxides form. Typically, the operating temperature of the catalyst is in the range from about 1700° to about 3200°F, preferably from about 2000° to about 3000°F. At least the portion of the combustion housing 14 surrounding catalyst 60 and any portion of housing 14 downstream of the catalyst must be constructed to withstand these combustion temperatures.

The operating temperature of catalyst 60 is determined by the adiabatic flame temperature of the mixture being combusted in the presence of the catalyst. Typically, the reactive surface of the catalyst is at or near the adiabatic flame temperature of the mixture (i.e., the operating temperature of the catalyst does not deviate more than about 300°F, more typically no more than about 150°F, from the adiabatic flame temperature of the mixture due to heat transfer from the catalyst), and combustion of the second mixture thus takes place at or near that adiabatic flame temperature. For a given fuel at any set of conditions (e.g., initial temperature and, to a lesser extent, pressure), the adiabatic flame temperature of a mixture of that fuel, air, and recycle gases is a function of the relative proportions of fuel, air, and recycle gases in the mixture. Since the relative proportions of fuel and air in the mixture supplied to the combustion housing 14 are governed by the considerations of stoichiometry and thermal efficiency discussed above (i.e., the need to provide at least enough air for complete combustion of the fuel and thermal combustion effluent but not substantially more than that amount), the desired adiabatic flame temperature, and therefore the desired temperature of combustion in the presence of the catalyst, is often achieved by adjusting the amount of recycle gases in the mixture supplied to the combustion housing 14 containing the catalyst.

In order to initially establish combustion in catalyst 60, housing 14 may include an ignitor (not shown) for initially igniting the second mixture of fuel and air entering housing 14, thereby heating catalyst 60 to a temperature which will sustain the desired combustion. Once these combustion temperatures have been reached in the catalyst, the ignitor can be deactivated and pre-ignition of the fuel discontinued. During this start-up operation, it may be necessary to alter the amounts and relative proportions of fuel, air, and recycle gases supplied by way of line 56 to insure flammable conditions in housing 14 prior to catalyst 60.

As illustrated, the combustion housing 14 is designed and catalyst 60 is located in housing 14 so that the second effluent gases, exiting from the combustion of the second mixture in housing 14, almost immediately enter second thermal combustion zone 22 in housing 12 and begin to mix with the first effluent gases rising from combustion zone 20. It will be appreciated that, in an alternative mode of operation (not illustrated), heat may be withdrawn from the second effluent during its passage from housing 14 to zone 22. Oxidation of the gases exiting from catalyst 60 may be substantially complete, although it is usually preferable to have thermal combustion of the fuel supplied to catalyst 60 continue downstream of the catalyst (i.e., in thermal combustion zone 22). This makes it possible to use less catalyst and reduce the required pressure drop across the catalyst. Although only one catalyst-containing combustion housing 14 is shown in the simplified schematic of FIG. 2, it will be understood that any number of similar combustion housings can be arrayed around the periphery of housing 12 in the vicinity of second thermal combustion zone 22 to insure rapid and complete mixing of the second effluent gases exiting from the combustion catalysts and the first effluent gases from first thermal combustion zone 20. The region of the furnace wherein such first and second effluents come together, along with the entirety of the combustion zone 22, thus constitutes means for mixing and thermally combusting the first and second effluents downstream of the catalyst.

In second thermal combustion zone 22, the mixture of gases from housing 14 and from first thermal combustion zone 20 accordingly is thermally combusted to produce a completely combusted final combustion effluent. Accordingly, any uncombusted fuel in the gases exiting from catalyst 60 and all of the carbon monoxide and any uncombusted fuel remaining in the gases from thermal combustion zone 20 are completely combusted to carbon dioxide and water in thermal combustion zone 22. Combustion in this second thermal combustion zone is induced and maintained by the temperature levels resulting from the combination of the first and second effluent gases. As mentioned above, the amount of air mixed with the fuel supplied to the furnace by way of line 56 is sufficient to support all of these combustion reactions in thermal combustion zone 22.

Conditions in thermal combustion zone 22 are determined by many factors including the temperature and composition of the gases exiting from housing 14, the temperature and composition of the gases rising from thermal combustion zone 20, the rate of heat transfer away from the gases in zone 22, etc. These conditions must, of course, be such as to insure substantially complete combustion of the gases supplied to thermal combustion zone 22 and are preferably also such as to prevent substantial formation of nitrogen oxides in zone 22. The combustion temperature of the admixed streams of gases from zone 20 and housing 14 being combusted in zone 22 is above the instantaneous autoignition temperature of the mixture of gases being combusted. On the other hand, the maximum combustion temperature in zone 22 is preferably below the temperature at which substantial formation of nitrogen oxides would occur. Typically, the combustion temperature in zone 22 is in the range from about 1700° to about 3200°F, preferably from about 2000° to about 3000°F.

Since heat is being withdrawn from the gases in zone 22, the adiabatic flame temperature of the gases being combusted is typically higher than the actual combustion temperature. Temperatures in zone 22 may be controlled in a number of ways. For example, temperatures in zone 22 may be monitored (e.g., by thermocouples, not shown) and the information thus produced may be used to control the amounts or proportions of fuel supplied to the furnace by way of lines 28 and 56. Alternatively or in addition, the temperature information can be used to control the amounts or proportions of air and/or recycle gases supplied to the furnace by way of lines 28 and 56 to adjust temperatures in zone 22. In view of the number of operating parameters which can be controlled, the system has a great deal of operating flexibility. Advantageously, the gases from first thermal combustion zone 20 can be fed to second thermal combustion zone 22 at substantially lower temperatures than would be possible in a conventional two-stage furnace, since the extremely stable combustion in the presence of catalyst 60 is available to support thermal combustion in zone 22 and insure complete combustion of incompleted combusted materials in the first effluent even though that effluent is relatively cool. In a conventional system, there is relatively little flexibility with regard to temperature of the first stage effluent since that effluent must be hot enough to support thermal combustion in the second stage. In the systems of the present invention, considerably more heat can be withdrawn from the first stage effluent to generate steam and the resulting relatively low temperature of the first stage effluent permits control of temperatures in zone 22 to a value below which substantial formation of nitrogen oxides occurs.

As in the case of first thermal combustion zone 20, heat is withdrawn from second thermal combustion zone 22 to generate additional steam in the boiler tubes 17. Particularly in the upper portion of thermal combustion zone 22, it may be desirable to have boiler tubes spaced throughout the interior of housing 12 to improve convective heat transfer from zone 22. When the final combustion effluent gases are too cool for further efficient transfer of heat to steam, those gases are exhausted from housing 12 by way of line 62. In the case of furnaces being operated to generate high pressure steam for use as a motive fluid in a steam turbine, for example, the final combustion effluent may exit from housing 12 at a temperature in the range from about 1000° to about 1800°F. The gases in line 62 are first passed through heat exchanger 64 where additional heat is recovered from them to preheat water returning to the furnace for conversion to steam via line 66. Thereafter, a portion of the gases in line 62 may be drawn off by way of recycle gas supply line 40 for recycling in the furnace as described above. The remainder of the gases in line 62 may be conducted to heat exchanger 68 where still more heat is recovered to preheat air brought into the system by way of line 70 and then distributed to the furnace by way of air supply line 30. Alternatively, some recycle gases may be drawn off after the heat exchange to air. Additional heat exchange units may be employed for other purposes. Finally the exhaust gases in line 62 are released into the atmosphere.

FIG. 3 shows a modification of the furnace of FIG. 2 in which not all of the fuel from fuel supply 50 passes through catalyst 60 prior to entering thermal combustion zone 22 in housing 12. In other respects, the furnace of FIG. 3 may be identical to the furnace of FIG. 2. In the furnace shown in FIG. 3, catalyst 60 is mounted in the combustion housing 14 in the center of perforated annular plate 80. Accordingly, a portion of the second mixture of fuel, air, and recycle gases supplied to the furnace by way of line 56 by-passes catalyst 60 and enters zone 22 in housing 12 through perforated plate 80. The remainder of the mixture passes through catalyst 60 and is at least partially combusted therein under the conditions set out and discussed hereinabove. In thermal combustion zone 22, all of the gases exiting from housing 14 are mixed with the gases rising from thermal combustion zone 20 and all of these gases are thermally combusted under conditions similar to those in zone 22 of the furnace of FIG. 2. This modification of the furnaces of this invention makes it possible to decrease the volume of catalyst needed in the combustion housing or housings 14.

Figure 4:
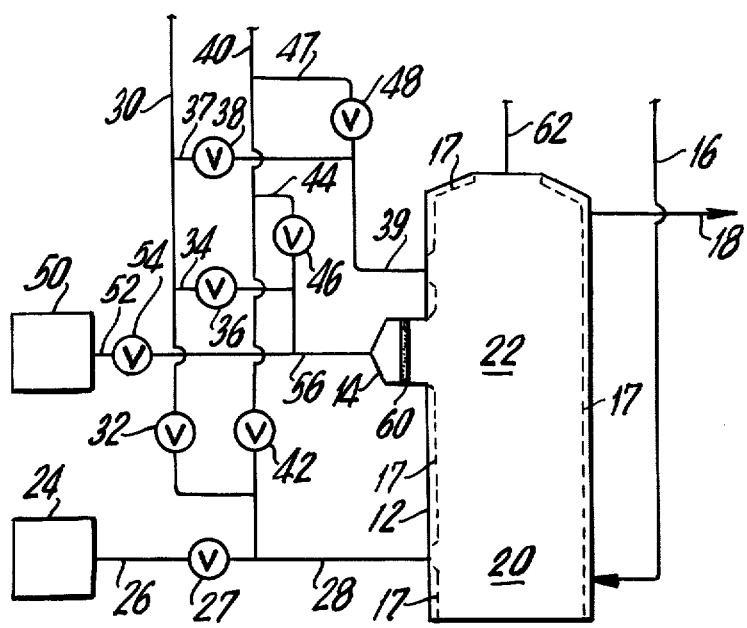
FIG. 4 is a simplified schematic drawing showing another modification of the furnace of FIG. 2 in accordance with the principles of this invention.

Some of the air and/or recycle gases which are mixed with the additional fuel supplied by way of line 56 in the furnaces shown in FIGS. 2 and 3 may be diverted entirely around the catalyst-containing combustion portion of the furnace and fed directly to the second thermal combustion zone as shown, for example, in FIG. 4. In the furnace of FIG. 4, air from air supply line 30 is fed to thermal combustion housing 12 above the combustion housing 14 by way of line 37 having valve 38 and line 39. Recycle gases from recycle gas supply line 40 may be mixed with the air in line 39 by means of line 47 having valve 48. The remainder of the furnace shown in FIG. 4 can be identical to the furnace shown in either FIG. 2 or FIG. 3. Although only one inlet port for the gases in line 39 is shown in the simplified schematic of FIG. 4, it will be understood that any number and arrangement of such inlet ports can be used. Similarly, although the inlet port for the gases in line 39 is above the catalyst-containing combustion housing 14 in the illustrative embodiment shown in FIG. 4, it will be understood that this inlet port alternatively can be below housing 14 or that comparable inlet ports can be arranged both above and below housing 14. In thermal combustion housing 12 the gases supplied by way of line 39 are mixed with the second effluent gases exiting from housing 14 and the first effluent gases rising from thermal combustion zone 20. All of these gases are thermally combusted in second thermal combustion zone 22 to produce a completely combusted final combustion effluent. Combustion in this second thermal combustion zone is induced and maintained by the temperature levels resulting from the combination of the first and second effluent gases. The total amount of air supplied to the furnace by way of lines 56 and 39 is preferably at least sufficient for complete combustion of all the combustible components in the fuel supplied by way of line 56 and all the combustible components (i.e., all the carbon monoxide and any uncombusted fuel) remaining in the first effluent to carbon monoxide and water. For reasons of thermal efficiency discussed above, the amount of air supplied by way of lines 56 and 39 is also preferably not substantially more than the amount actually needed to produce a completely combusted final combustion effluent. Accordingly, the total amount of air supplied by way of lines 56 and 39 in the furnace of FIG. 4 may be approximately equal to the amount of air supplied by way of line 56 in the furnace of FIG. 2.

Figure 5:
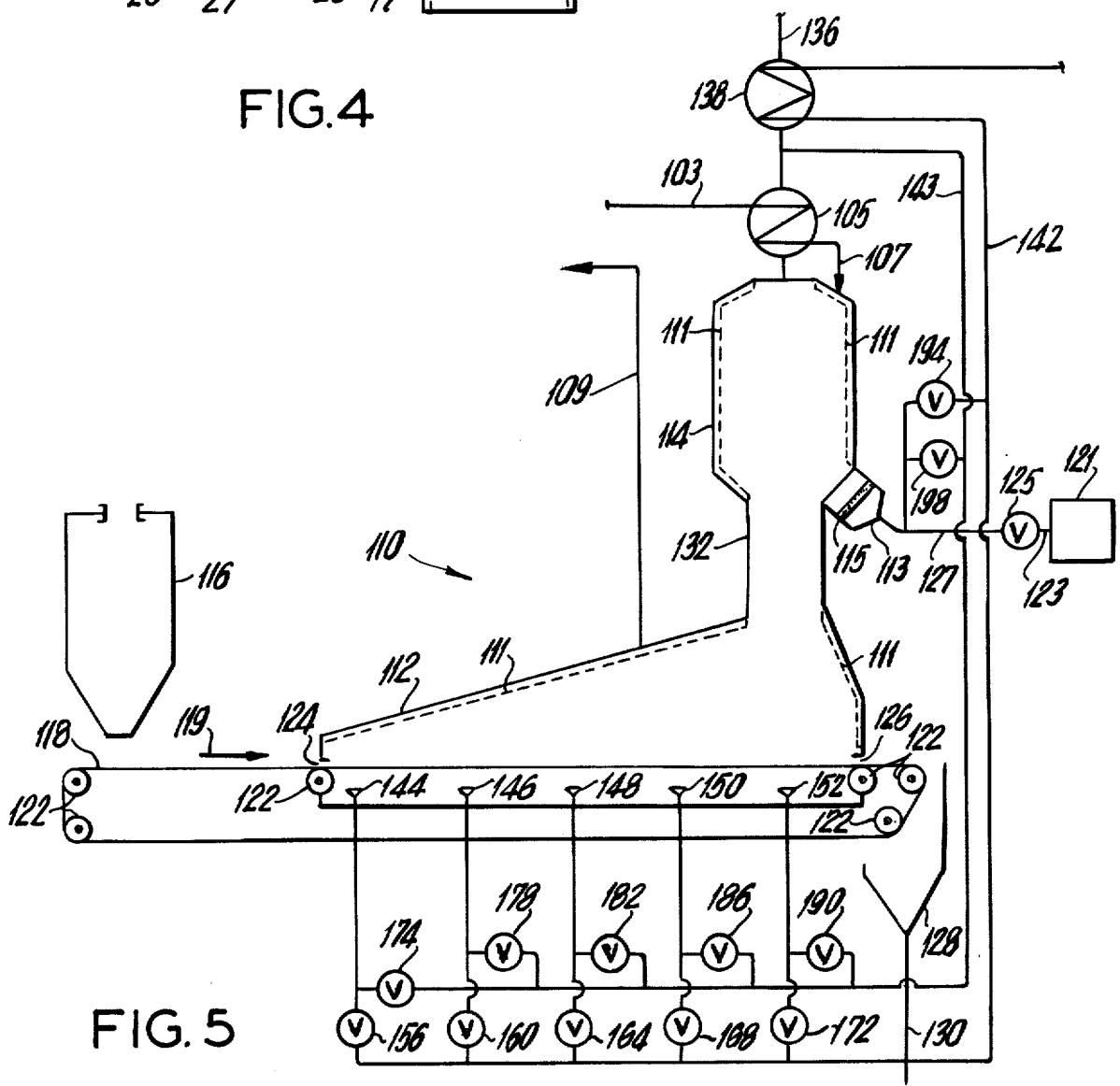
FIG. 5 is a simplified schematic drawing showing a furnace constructed in accordance with the principles of this invention for burning solid carbonaceous fuel in the first combustion stage and for combusting atomized, vaporized, gaseous, or gasified carbonaceous fuel in the presence of a catalyst in the second combustion stage.

FIG. 5 shows a furnace 110 constructed in accordance with the principles of this invention in which solid carbonaceous fuel (e.g., coal, coke, etc.) can be burned directly in the first thermal combustion stage without prior gasification. The initial combustion of the solid carbonaceous fuel takes place in first thermal combustion housing 112. Solid fuel from fuel supply 116 is deposited on conveyor belt 118 which is supported on rollers 122 and driven continuously in the direction indicated by arrow 119. Conveyor belt 118 carries the solid fuel into first thermal combustion housing 112 through fuel inlet port 124 and acts as a continuously moving bed for the fuel during the thermal combustion thereof inside housing 112. Any solid residue of this thermal combustion is carried out of housing 112 on belt 118 through solid residue outlet port 126 and is dumped into collection bin 128 for removal from the system via line 130.

As the solid fuel is carried across first thermal combustion housing 112 on belt 118, it is thermally combusted in air supplied to nozzles 144, 146, 148, 150, and 152 from air supply line 142. The amount of air supplied to nozzles 144, 146, 148, 150, and 152 is respectively controlled by valves 156, 160, 164, 168, and 172. Recycle gases from recycle gas supply line 143 may be supplied to any or all of nozzles 144, 146, 148, 150, and 152 in amounts respectively determined by valves 174, 178, 182, 186, and 190. The amounts of air and recycle gases supplied to each of nozzles 144, 146, 148, 150, and 152 may be controlled to provide substantially complete utilization of all the fuel values in the solid fuel without the production of excessive amounts of nitrogen oxides in thermal combustion housing 112. The total amount of air supplied to nozzles 144, 146, 148, 150, and 152 is substantially less than the stoichiometric amount for the amount of solid fuel supplied to housing 112. Typically, the amount of air supplied to housing 112 may be about 50 to 90, preferably about 55 to 80, percent of the stoichiometric amount for the solid fuel supplied to housing 112. Accordingly, the gaseous first effluent of the thermal combustion taking place in housing 112 contains a substantial proportion of carbon monoxide and may in addition contain some uncombusted or partially combusted fuel (e.g., some unburned or partially burned hydrocarbons). Heat is withdrawn from the gases in housing 112 (e.g., to generate steam in boiler tubes 111 in housing 112) and these gases then exit from housing 112 by way of line 132.

Additional carbonaceous fuel supplied from fuel supply 121 by way of line 123 having valve 125 is mixed with additional air from air supply line 142 and recycle gases from recycle gas supply line 143 in amounts respectively determined by valves 194 and 198 to produce a catalytically combustible mixture in line 127. The mixture in line 127 is fed into the presence of the catalyst in combustion housing 113. Combustion housing 113 may be similar to the catalyst-containing combustion housing 14 in the furnace shown in FIG. 2 in this application. Accordingly, housing 113 includes solid oxidation catalyst 115 (similar to catalyst 60 in the furnace of FIG. 2) extending across a portion of the housing. In catalyst 115 at least a portion of the mixture of fuel, air, and recycle gases supplied to housing 113 is combusted under the required conditions which may be exactly the same as those described above in connection with the combustion housing 14 in the furnace of FIG. 2. Accordingly, the fuel supplied by fuel supply 121 must be at least partially in catalytically combustible form at least by the time it is combusted in the presence of catalyst 115, and the amount of air supplied to the combustion housing 113 is preferably just sufficient for complete combustion of the fuel from fuel supply 121 and for complete combustion of the remaining values in the first combustion effluent passing from housing 112. Alternatively, the amount of air supplied to housing 113 may be somewhat less than the above-mentioned amount and the difference then supplied directly to second thermal combustion housing 114 in a manner analogous to the embodiment shown in FIG. 4.

In second thermal combustion housing 114, the first effluent gases exiting from combustion housing 112 and the second effluent gases from the housing 113 are mixed and thermally combusted to produce a completely combusted final combustion effluent. The combustion taking place in the presence of catalyst 115 induces or supports the combustion downstream of the catalyst and in housing 114. Conditions in housing 114 may be similar to conditions in zone 22 in the furnace of FIG. 2. Additional heat is withdrawn from the gases in housing 114 to generate additional steam in boiler tubes 111 in housing 114. When these gases are too cool for further efficient transfer of heat to steam, they are exhausted from housing 114 by way of line 136. In heat exchanger 105, some of the thermal energy in the final combustion effluent in line 136 is recovered to preheat water returning to the furnace by way of line 103 for conversion to steam. This preheated water is supplied to boiler tube system 111 by way of line 107 and, after conversion to steam in that boiler tube system, exits by way of line 109. After heat exchanger 105, a portion of the final combustion effluent in line 136 is drawn off by way of line 143 for recycling in the furnace as described above. The remainder of the final combustion effluent is used to preheat air in heat exchanger 138 and is then exhausted into the atmosphere.

The solid oxidation catalysts useful for the invention may include any of a number of catalysts used for the oxidation of fuels. Typically, the catalyst comprises a carrier and an active component with or without the addition of other activators or promoters. These catalysts may include a wide variety of materials as well as configurations or structures. For example, the catalyst may comprise a packed bed of pellets, saddles, rings, or the like. Preferably, the catalyst comprises a monolithic or unitary structure comprising a ceramic substrate or carrier impregnated with one or more catalytically-active components. Monoliths of this type may be thin-walled honeycomb-type structures. The flow channels in the honeycomb structures are usually parallel and may be of any desired cross-section such as triangular or hexangular. The number of channels per square inch may vary greatly depending upon the particular application, and monolithic honeycombs are commercially available having anywhere from about 50 to 2000 channels per square inch. The substrate or carrier portion of the honeycomb desirably is porous, but may be essentially non-porous, and catalytically is relatively inert. The substrate may be provided with a porous film or coating, typically of alumina, which is impregnated with one or more catalytically-active components. Structures of this type are particularly desirable because the pressure drop of gases passing through them is relatively low, and generally they are self-supporting. The catalytically-active component of the catalyst is generally metal either in the elemental state or in the combined state such as an oxide. Examples of such metals are zirconium, vanadium, chromium, manganese, copper, platinum, palladium, iridium, rhodium, ruthenium, cerium, cobalt, nickel and iron. The particular catalyst and amount employed may depend primarily upon the design of the combustion system, the type of fuel used and operating temperature. The pressure drop of the gases passing through the catalyst, for example, may be below about 10 psi, preferably below about 3 psi, or less than about 10 percent of the total pressure.

It is to be understood that the embodiments shown and described herein are illustrative of the principles of this invention only and that various modifications may be implemented by those skilled in the art without departing from the scope and spirit of the invention. For example, various methods of distributing the fuel in the thermal combustion zone of the furnace may be employed as discussed above. Another example of modifications within the scope of the invention are the various alternative forms of catalyst mentioned above.

What is claimed is:

1. The method of combusting carbonaceous fuel to produce energy in the form of heat comprising the steps of:

thermally combusting a first mixture, formed of a first carbonaceous fuel and an amount of air substantially less than that needed for complete combustion to carbon dioxide and water of all the combustible components in said first fuel, to produce a gaseous first effluent;

forming a second mixture of a second carbonaceous fuel and air;

combusting at least a portion of said second mixture under essentially adiabatic conditions in the presence of a solid oxidation catalyst operating at a temperature substantially above the instantaneous auto-ignition temperature of said second mixture but below a temperature that would result in any substantial formation of oxides of nitrogen to produce a second effluent;

mixing said first effluent and said second effluent; and thermally combusting the mixture of first effluent and second effluent downstream of the catalyst to produce a final combustion effluent.

2. The method defined in claim 1 wherein said first effluent contains a substantial proportion of carbon monoxide.

3. The method defined in claim 2 wherein the amount of air supplied in said first mixture for thermal combustion of said first fuel is from about 50 to 90 percent of the stoichiometric amount for said first fuel.

4. The method defined in claim 2 wherein said first fuel is solid fuel and wherein the amount of air supplied in said first mixture for thermal combustion of said first fuel is from about 55 to 80 percent of the stoichiometric amount for said first fuel.

5. The method defined in claim 2 wherein said first fuel is a liquid or gaseous hydrocarbon and wherein the amount of air supplied in said first mixture for thermal combustion of said first fuel is from about 80 to 90 percent of the stoichiometric amount of said first fuel.

6. The method defined in claim 2 wherein the operating temperature of the catalyst is in the range from about 1700° to about 3200°F.

7. The method defined in claim 2 wherein the operating temperature of the catalyst is in the range from about 2000° to about 3000°F.

8. The method defined in claim 2 wherein the thermal combustion of the mixture of first effluent and second effluent takes place at a temperature in the range from about 1700° to about 3200°F and wherein at least a portion of the thermal energy produced by said method is withdrawn from said thermal combustion of said mixture of first and second effluents.

9. The method defined in claim 2 wherein the air supplied in said second mixture includes at least enough free oxygen to complete the combustion to carbon dioxide and water of all the combustible components in said second fuel and of all the combustible components remaining in said first effluent.

10. The method defined in claim 2 wherein the amount of air supplied in said second mixture is less than the amount needed for complete combustion to carbon dioxide and water of all the combustible components in said second fuel and of all the combustible components remaining in said first effluent, and wherein said step of mixing the first effluent and the second effluent further includes mixing said effluents with further air, the amount of air supplied in said second mixture and the amount of said further air together providing an amount of air at least sufficient for the complete combustion of all the combustible components in said second fuel and of all the combustible components remaining in said first effluent.

11. The method defined in claim 2 wherein only a portion of said second mixture is combusted in the presence of said solid oxidation catalyst and the remainder of said second mixture is mixed and thermally combusted with said first effluent downstream of the catalyst.

12. The method defined in claim 2 wherein only a portion of said second mixture is combusted in the presence of said solid oxidation catalyst and a remaining portion of said second mixture by-passes the catalyst and is mixed and thermally combusted with said first effluent downstream of the catalyst.

13. The method defined in claim 2 wherein a portion of said final combustion effluent is mixed with the air supplied in forming said first mixture to recycle said portion of said final combustion effluent.

14. The method defined in claim 2 wherein a portion of said final combustion effluent is included in the forming of said second mixture to recycle said portion of the final combustion effluent.

15. The method defined in claim 2 wherein at least some of the thermal energy in said final combustion effluent is recovered to preheat at least some of the air supplied to at least one of the combustion steps.

16. The method defined in claim 2 wherein said carbonaceous fuels are being combusted to produce heat for the generation of steam and wherein said method further comprises the steps of:
 withdrawing heat from the gaseous first effluent to generate steam prior to mixing said first effluent with said second effluent; and
 withdrawing heat from the gaseous final combustion effluent to generate additional steam.

17. The method of operating a furnace to burn carbonaceous fuel to produce energy in the form of heat comprising the steps of:
 thermally combusting a first mixture, formed of a first carbonaceous fuel and an amount of air substantially less than that needed for complete combustion to carbon dioxide and water of all the combustible components in said first fuel, to produce a gaseous first effluent containing at least about 5 volume percent carbon monoxide;
 forming a second mixture of a second carbonaceous fuel and air, having an adiabatic flame temperature in the range from about 1700° to about 3200°F;
 combusting at least a portion of said second mixture under essentially adiabatic conditions in the presence of a solid oxidation catalyst operating at a temperature substantially above the instantaneous auto-ignition temperature of said second mixture but below a temperature that would result in any substantial formation of oxides of nitrogen to produce a second effluent;
 mixing said first effluent and said second effluent; and
 thermally combusting the mixture of first effluent and second effluent downstream of the catalyst to produce a final combustion effluent.

18. The method defined in claim 17 wherein said first effluent contains from about 10 to about 30 volume percent carbon monoxide.

19. The method defined in claim 17 wherein the adiabatic flame temperature of said second mixture is in the range from about 2000° to about 3000°F.

20. The method defined in claim 17 wherein the thermal combustion of the mixture of first effluent and second effluent takes place at a temperature in the range from about 1700° to about 3200°F and wherein at least a portion of the thermal energy produced by said method is withdrawn from said thermal combustion of the mixture of first and second effluents.

21. The method defined in claim 17 wherein the air supplied in said second mixture includes at least enough free oxygen to complete the combustion to carbon dioxide and water of all the combustible components in said second fuel and of all the combustible components remaining in said first effluent.

22. The method defined in claim 17 wherein the amount of air supplied in said second mixture is less than the amount needed for complete combustion to carbon dioxide and water of all the combustible components in said second fuel and of all the combustible components remaining in said first effluent, and wherein said step of mixing the first effluent and the second effluent further includes mixing said effluents with further air, the amount of air supplied in said second mixture and the amount of said further air together providing an amount of air at least sufficient for the complete combustion of all the combustible components in said second fuel and of all the combustible components remaining in said first effluent.

23. The method defined in claim 17 wherein only a portion of the second mixture is combusted in the presence of said solid oxidation catalyst and the remainder of said second mixture is mixed and thermally combusted with said first effluent downstream of the catalyst.

24. The method defined in claim 17 wherein only a portion of said second mixture is combusted in the presence of said solid oxidation catalyst and a remaining portion of said second mixture by-passes the catalyst and is mixed and thermally combusted with said first effluent downstream of the catalyst.

25. The method defined in claim 17 wherein a portion of said final combustion effluent is included in the forming of said second mixture to recycle said portion of the final combustion effluent.

26. The method defined in claim 17 wherein at least some of the thermal energy in said final combustion effluent is recovered to preheat at least some of the air supplied to at least one of the combustion steps.

27. The method defined in claim 17 wherein said carbonaceous fuels are being combusted to produce heat for the generation of steam and wherein said method further comprises the steps of:
withdrawing heat from the gaseous first effluent to generate steam prior to mixing said first effluent with said second effluent; and
withdrawing heat from the gaseous final combustion effluent to generate additional steam.

28. The method of operating a furnace to burn carbonaceous fuel to produce energy in the form of heat comprising the steps of:
thermally combusting a first mixture, formed of a first carbonaceous fuel and an amount of air substantially less than that needed for complete combustion to carbon dioxide and water of all the combustible components in said first fuel, to produce a gaseous first effluent containing at least about 5 volume percent carbon monoxide;
forming a second mixture of a second carbonaceous fuel, inert gases, and air, said second mixture having an adiabatic flame temperature in the range from about 1700° to about 3200°F;
combusting at least a portion of said second mixture under essentially adiabatic conditions in the presence of a solid oxidation catalyst operating at a temperature substantially above the instantaneous auto-ignition temperature of said second mixture but below a temperature that would result in any substantial formation of oxides of nitrogen to produce a second effluent;
mixing said first effluent and said second effluent; and
thermally combusting the mixture of first effluent and second effluent downstream of the catalyst to produce a final combustion effluent.

29. The method defined in claim 28 wherein said first effluent contains from about 10 to about 30 volume percent carbon monoxide.

30. The method defined in claim 28 wherein the adiabatic flame temperature of said second mixture is in the range from about 2000° to about 3000°F.

31. The method defined in claim 28 wherein the thermal combustion of the mixture of first effluent and second effluent takes place at a temperature in the range from about 1700° to about 3200°F and wherein at least a portion of the thermal energy produced by said method is withdrawn from said thermal combustion of the mixture of first and second effluents.

32. The method defined in claim 28 wherein the air supplied in said second mixture includes at least enough free oxygen to complete the combustion to carbon dioxide and water of all the combustible components in said second fuel and of all the combustible components remaining in said first effluent.

33. The method defined in claim 28 wherein the amount of air supplied in said second mixture is less than the amount needed for complete combustion to carbon dioxide and water of all the combustible components in said second fuel and of all the combustible components remaining in said first effluent and wherein said step of mixing the first effluent and the second effluent further includes mixing said effluents with further air, the amount of air supplied in said second mixture and the amount of said further air together providing an amount of air at least sufficient for the complete combustion of all the combustible components in said second fuel and of all the combustible components remaining in said first effluent.

34. The method defined in claim 28 wherein only a portion of the second mixture is combusted in the presence of said solid oxidation catalyst and the remainder of said second mixture is mixed and thermally combusted with said first effluent downstream of the catalyst.

35. The method defined in claim 28 wherein said inert gases included in said second mixture are a recycled portion of said final combustion effluent.

36. The method defined in claim 28 wherein said carbonaceous fuels are being combusted to produce heat for the generation of steam and wherein said method further comprises the steps of:
withdrawing heat from the gaseous first effluent to generate steam prior to mixing said first effluent with said second effluent; and
withdrawing heat from the gaseous final combustion effluent to generate additional steam.

37. A furnace for burning carbonaceous fuel to produce energy in the form of heat comprising:
combustion means for thermally combusting a first mixture, formed of a first carbonaceous fuel and an amount of air substantially less than that needed for complete combustion to carbon dioxide and water of all the combustible components in said first fuel, to produce a first effluent;
first heat transfer means, associated with said combustion means, for withdrawing heat from said combustion means;
means for forming a second mixture of a second carbonaceous fuel and air;
a solid oxidation catalyst, operating at a temperature substantially above the instantaneous auto-ignition temperature of said second mixture but below a temperature that would result in any substantial formation of oxides of nitrogen, disposed for combusting at least a portion of said second mixture in the presence of said catalyst under essentially adiabatic conditions to produce a second effluent;
means for mixing and thermally combusting the first effluent and the second effluent downstream of the catalyst to produce a final combustion effluent; and
second heat transfer means, associated with said means for mixing and thermally combusting, for withdrawing heat from said means for mixing and thermally combusting.

38. The furnace defined in claim 37 further comprising means, associated with said means for forming a second mixture, for mixing into said second mixture a portion of said final combustion effluent to recycle said portion of the final combustion effluent.

39. The furnace defined in claim 37 further comprising means for conducting a portion of said second mixture directly to said means for mixing and thermally combusting without passing said portion in the presence of said solid oxidation catalyst.

40. The furnace defined in claim 37 further comprising means for recovering at least a portion of the thermal energy in said final combustion effluent to preheat at least a portion of the air supplied to the furnace.

41. The furnace defined in claim 37 further comprising means for mixing further air with the mixture of said first effluent and said second effluent being combusted downstream of the catalyst.

42. The furnace defined in claim 37 wherein the carbonaceous fuel is being burned to produce heat for the generation of steam and wherein said first and second heat transfer means are adapted to withdraw heat from the associated portion of said furnace to generate steam.

43. A furnace for burning carbonaceous fuel to produce energy in the form of heat to generate steam comprising:

combustion means for thermally combusting a first mixture, formed of a first carbonaceous fuel and an amount of air substantially less than that needed for complete combustion to carbon dioxide and water of all the combustible components in said first fuel, to produce a first effluent containing a substantial proportion of carbon monoxide;

first heat transfer means, associated with said combustion means, for withdrawing heat from said combustion means to generate steam;

means for forming a second mixture of a second carbonaceous fuel, air, and inert gases, said second mixture having an adiabatic flame temperature in the range from about 1700° to about 3200°F;

a solid oxidation catalyst, operating at a temperature substantially above the instantaneous auto-ignition temperature of said second mixture but below a temperature that would result in any substantial formation of oxides of nitrogen, disposed for combusting at least a portion of said second mixture under essentially adiabatic conditions in the presence of said catalyst to produce a second effluent;

means for mixing and thermally combusting the first effluent and the second effluent downstream of the catalyst to produce a final combustion effluent; and second heat transfer means for withdrawing heat from said means for mixing and thermally combusting to generate steam.

44. The furnace defined in claim 43 further comprising means, associated with said means for forming a second mixture, for mixing into said second mixture a portion of said final combustion effluent to recycle said portion of the final combustion effluent.

45. The furnace defined in claim 43 further comprising means for conducting a portion of said second mixture directly to said means for mixing and thermally combusting without passing said portion in the presence of said solid oxidation catalyst.

46. The furnace defined in claim 43 further comprising means for recovering at least a portion of the thermal energy in said final combustion effluent to preheat at least a portion of the air supplied to the furnace.

* * * * *

UNITED STATES PATENT AND TRADEMARK OFFICE
CERTIFICATE OF CORRECTION

PATENT NO. : 3,914,090
DATED : October 21, 1975
INVENTOR(S) : William C. Pfefferle It is certified that error appears in the above-identified patent and that said Letters Patent are hereby corrected as shown below:

"Related U.S. Application Data" - at the end of the "Data", delete ,"abandoned"

Column 4, line 60 "realtive" should read --relative--.

Column 5, line 43, "state" should read --stage--.

Claim 5, lines 68, column 16, "of" after the word amount should read --for--.

Signed and Sealed this

Tenth Day of May 1977

[SEAL]

Attest:

RUTH C. MASON
Attesting Officer

C. MARSHALL DANN
Commissioner of Patents and Trademarks